(No Model.) 3 Sheets—Sheet 1.

J. F. W. DORMAN.
POWER PRESS FOR VULCANIZING RUBBER, &c.

No. 445,426. Patented Jan. 27, 1891.

WITNESSES
Dan'l Fisher
W. C. Jenness

INVENTOR
John F. W. Dorman,
by G. H. & W. T. Howard,
Atty's.

(No Model.) 3 Sheets—Sheet 3.

J. F. W. DORMAN.
POWER PRESS FOR VULCANIZING RUBBER, &c.

No. 445,426. Patented Jan. 27, 1891.

WITNESSES
Dan'l Fisher

INVENTOR
John F. W. Dorman,

UNITED STATES PATENT OFFICE.

JOHN F. W. DORMAN, OF BALTIMORE, MARYLAND.

POWER-PRESS FOR VULCANIZING RUBBER, &c.

SPECIFICATION forming part of Letters Patent No. 445,426, dated January 27, 1891.

Application filed June 21, 1890. Serial No. 356,257. (No model.)

*To all whom it may concern:*

Be it known that I, JOHN F. W. DORMAN, of the city of Baltimore, in the State of Maryland, have invented certain Improvements in Power-Presses for Vulcanizing Rubber, &c., of which the following is a specification.

This invention relates to certain improvements in an apparatus for vulcanizing rubber, for which Letters Patent No. 407,255 were granted on the 16th day of July, 1889, to Louis K. Scotford, to which reference should be had. The said machine is also employed for making stereotypes from celluloid, which are used by printers.

Rubber stamps and celluloid stereotypes are made by laying the sheet material on the prepared mold, which is placed between two steam-boxes. Heat and power are applied to the mold to soften the rubber or celluloid and press it into the mold. With rubber the heat must be maintained above and below it at the same temperature after being softened and molded until it is cooked or vulcanized. With celluloid a high temperature is also required above and below the mold, and very great pressure. The molds for rubber or celluloid stereotypes are made by pressing a composition or cement of about the consistency of putty down upon the type. In all cases this pressure must be evenly distributed over the surface of the mold to produce stereotypes of uniform thickness; otherwise they would not print. The present invention effects these results by substituting compound toggles for the direct screw and follow nuts used in the Scotford invention, by maintaining the same heat in the platen or top box as in the lower box or bed, and by not wasting water by letting the condensed steam escape. Flexible rubber steam-pipes are substituted for the iron pipes shown in the said patent, arranged so that a continuous movement of water and steam from the lower box or bed to the upper one or platen and thence again to the bed is maintained, and a check-valve is placed in the return-pipe to prevent ebullition of water checking the circulating current, as will hereinafter fully appear.

In the further description of the said invention which follows reference is made to the accompanying drawings, forming a part hereof, and in which—

Figure 1:
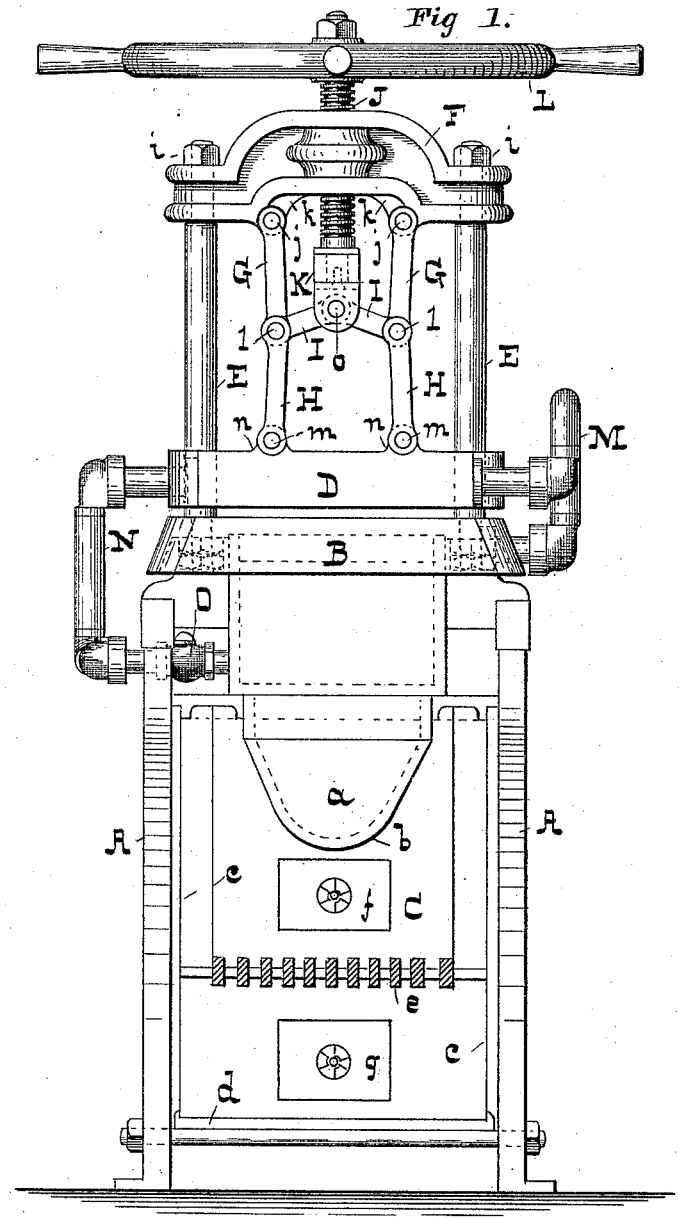
Figure 2:
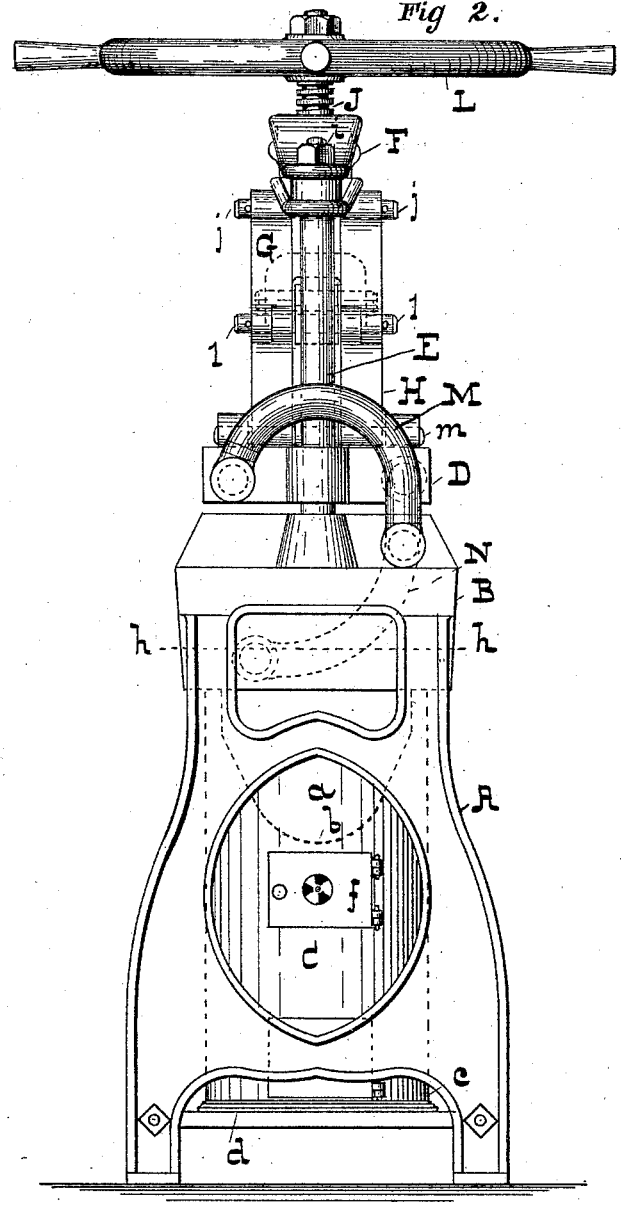

Figure 1 is a partly-sectional front view of the apparatus, and Fig. 2 an exterior side or end view of the same. Figs. 3 to 11, inclusive, are details of the invention as hereinafter described.

In the said drawings, A represents the frame or stand of the apparatus, upon which is mounted the stationary box B, which constitutes the base of the press. This base, which is designed to hold a body of water, is provided with a hollow downward extension $a$, with preferably a rounded bottom $b$.

C is a fire-box formed of a cylindrical shell $c$, which at its upper end comes in contact with the under side of the box B proper, and at its lower end it is provided with a palate $d$, which closes it. The furnace or fire-box is fitted with grate-bars $e$. (Shown only in section in Fig. 1.)

The fire and ash-pit doors are respectively denoted by $f$ and $g$.

The water-line in the box B is represented by a dotted line $h$.

D is the upper or movable box, which constitutes the platen adapted to have an upward and downward motion on the standards E. The standards are surmounted by a yoke F, held thereto by the nuts $i$.

G G are bars connected by pins $j$ to lugs $k$ on the under side of the yoke F.

Figure 3:
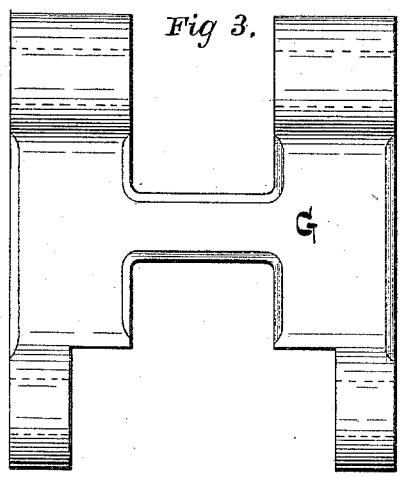
Figure 4:
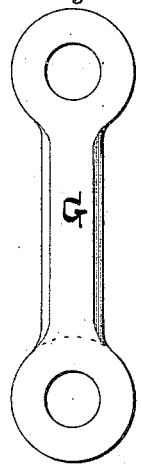

Figs. 3 and 4 represent two enlarged views of one of these bars. Similar bars H are jointed to the ones G by means of pins $l$ and at their lower ends pivoted by means of pins $m$ to lugs $n$ on the upper surface of the movable box or platen D.

Figure 5:
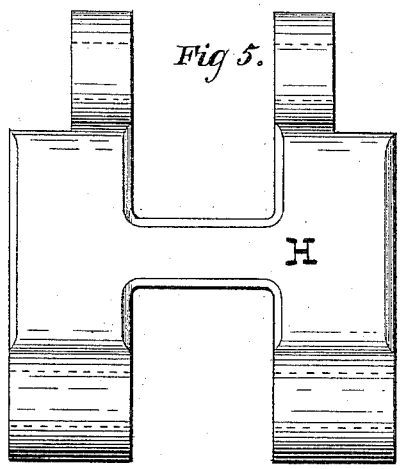
Figure 6:

Figs. 5 and 6 are enlarged views of one of these bars. The bars G and H, connected as described, form two toggles, which as they are forced from a bent position to a straight one drive the platen D toward the bed, and this movement serves to compress the mold (not shown) with its contained rubber or celluloid. To effect the straightening of the toggles, they are united by the horizontal or cross bars I, which are connected thereto by the pins $l$ and centrally together by the pin $o$.

Figure 10:
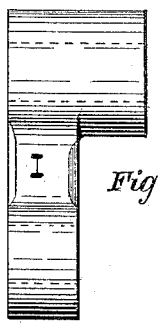
Figure 11:
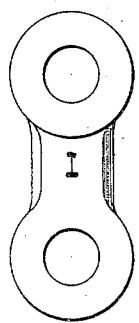
Figure 7:
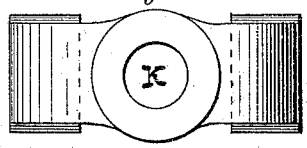
Figure 8:
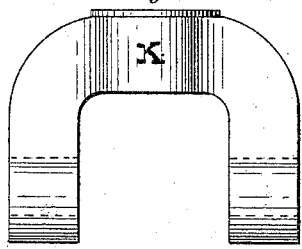
Figure 9:
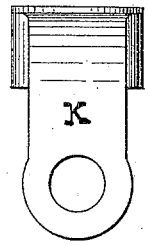

Figs. 10 and 11 are enlarged views of one of these bars. The said bars I form another toggle, which, as forced down at the center and straigtened, actuates the toggles first described. The straightening of the horizontal toggle is accomplished by a screw J, which passes through a similarly-threaded hole in the yoke F and is at its lower end adapted to turn freely in a forked bar K, united to the pin *o*. This forked bar is represented on an enlarged scale by Figs. 7, 8, and 9, which are respectively a top, a side, and an end view of the same. The screw J is actuated by hand through the medium of the wheel L. The toggle movement above described may also be applied to molding-presses and those used to copy letters.

Referring to Fig. 2, it will be seen that the right side of the bed B at a point above the water-line *h* is connected to the left side of the platen D by an upwardly-curved flexible pipe M, preferably rubber steam-hose, and at the other end of the machine the right side of the platen is united by a similar pipe N, having a downward curve, to the left side of the bed and at a point below the said water-line. The pipe M is to carry live steam from the bed to the platen and the other pipe N to return the same steam or its water of condensation to the water-space of the bed. This arrangement of flexible pipes admits of a vertical motion of the platen, and at the same time effects the free circulation of steam and water condensation through the two boxes, or, in other words, the bed and platen, which insures a common temperature to both.

In all steam-generators with a low steam-space there is a tendency to prime—that is to say, to carry water upward with the steam. Such priming occurs in this apparatus, and if controlled so as not to interfere with circulation is not objectionable. To control this lifting of water the return-pipe N is fitted with the inwardly-opening check-valve O, before alluded to, which prevents the entrance of water thereto in its ebullition, but opens to the return-water, owing to the height of the column of water in the said pipe overcoming the equilibrium of pressure. In other words, the equilibrium of steam-pressure on the two sides of the check-valve is destroyed by the additional weight of water above it, and it remains open, except when it receives a sudden shock from the ebullition of water from below.

The apparatus being provided with the flexible pipes M and N, joints and couplings are dispensed with.

I claim as my invention—

1. In a press, the combination, with the movable platen, of a pair of upright toggles for directly imparting motion thereto, a horizontal toggle connecting the central joints of the upright toggles, and a screw working in the fixed yoke and directly connected with the central joint of the horizontal toggle, substantially as specified.

2. In a press, a stationary water and steam bed and a movable steam-platen situated over the bed, combined with flexible connecting-pipes arranged to carry steam to the platen and return the same or water of condensation to the bed at a point below the water-line, substantially as and for the purpose specified.

3. In a press, a stationary water and steam bed and a movable steam-platen situated over the stationary bed, combined with flexible connecting-pipes arranged to carry steam to the platen and return the same or water of condensation to the bed at a point below the water-line, and a check-valve in the return-pipe to prevent the ebullition of water in the bed from checking the circulation of steam, substantially as and for the purpose specified.

4. A press having a stationary water-holding bed and a steam-holding platen, combined with a flexible pipe which connects the steam-space of the bed at one end thereof with the opposite side of the platen, and a similar pipe which unites the platen with the bed at a point below the water-line and in a reverse position to the first, substantially as and for the purpose specified.

JOHN F. W. DORMAN.

Witnesses.
 CHAS. E. DURBEN,
 JNO. T. MADDOX.